(12) United States Patent
Jones et al.

(10) Patent No.: US 10,013,489 B2
(45) Date of Patent: Jul. 3, 2018

(54) SYSTEM AND METHOD FOR PROVIDING RECOMMENDATIONS

(75) Inventors: M. Cameron Jones, San Jose, CA (US); Elizabeth F. Churchill, San Francisco, CA (US); Athellina Athsani, San Jose, CA (US)

(73) Assignee: OATH INC., New York, NY (US)

( * ) Notice: Subject to any disclaimer, the term of this patent is extended or adjusted under 35 U.S.C. 154(b) by 852 days.

(21) Appl. No.: 12/540,337

(22) Filed: Aug. 12, 2009

(65) Prior Publication Data
US 2011/0040756 A1 Feb. 17, 2011

(51) Int. Cl.
*G06Q 10/00* (2012.01)
*G06F 17/30* (2006.01)

(52) U.S. Cl.
CPC .............. *G06F 17/30864* (2013.01)

(58) Field of Classification Search
USPC ........................................................ 705/319
See application file for complete search history.

(56) References Cited

U.S. PATENT DOCUMENTS

| | | | | |
|---|---|---|---|---|
| 6,029,195 A * | 2/2000 | Herz | ................. | G06F 17/30867 348/E7.056 |
| 6,567,797 B1 * | 5/2003 | Schuetze | ............ | G06F 17/3061 |
| 6,681,247 B1 * | 1/2004 | Payton | .............. | G06F 17/30595 707/999.005 |
| 7,013,238 B1 * | 3/2006 | Weare | ................... | G06Q 30/02 702/182 |
| 2001/0049620 A1 * | 12/2001 | Blasko | ................... | G06Q 10/10 705/14.53 |
| 2002/0102967 A1 * | 8/2002 | Chang | ................ | G06Q 30/0601 455/414.1 |
| 2004/0122803 A1 * | 6/2004 | Dom | ................. | G06F 17/30867 |
| 2005/0125277 A1 * | 6/2005 | Estrada | .................. | G06Q 10/10 705/301 |
| 2006/0200435 A1 * | 9/2006 | Flinn | .................... | G06N 99/005 706/12 |
| 2006/0218153 A1 * | 9/2006 | Voon | ................. | G06F 17/30873 |
| 2006/0218225 A1 * | 9/2006 | Hee Voon | ............. | G06Q 30/02 709/201 |
| 2007/0185744 A1 * | 8/2007 | Robertson | ............. | G06Q 10/02 705/5 |

(Continued)

OTHER PUBLICATIONS

GoPlanit: GoPlanit launches the first travel planning tool that creates a personalized trip calendar (or itinerary) at the click of a button; New travel planning tool saves users time when planning, organizing and sharing trips with friends. Anonymous. M2 Presswire; Coventry [Coventry]Sep. 17, 2008.*

*Primary Examiner* — Gabrielle McCormick
(74) *Attorney, Agent, or Firm* — James J. DeCarlo; Greenberg Traurig, LLP

(57) ABSTRACT

Methods, systems, and computer program products for providing recommendations for an activity to a user are provided. In one method, the method tracks status information of a plurality of users, and detects a trigger for providing recommendations for an activity. In response the trigger, the method identifies a cluster of users based on the status information of the users. The method further retrieves profiles and behavioral characteristics of the users in the identified cluster, and provides one or more recommendations for the activity to the user based, at least in part, upon the behavioral characteristics and the profiles.

18 Claims, 16 Drawing Sheets

(56) References Cited

U.S. PATENT DOCUMENTS

| | | | |
|---|---|---|---|
| 2007/0239554 A1* | 10/2007 | Lin | G06F 17/30867 |
| | | | 705/26.7 |
| 2008/0153518 A1 | 6/2008 | Herberger | H04L 12/1818 |
| | | | 455/466 |
| 2008/0209350 A1* | 8/2008 | Sobotka | G06F 3/0482 |
| | | | 715/762 |
| 2009/0077000 A1* | 3/2009 | Begole | G06Q 10/10 |
| | | | 706/54 |
| 2009/0132365 A1* | 5/2009 | Gruenhagen | G06F 17/30699 |
| | | | 705/14.69 |
| 2009/0193097 A1* | 7/2009 | Gassewitz | G06F 15/173 |
| | | | 709/218 |
| 2011/0040756 A1* | 2/2011 | Jones | G06F 17/30864 |
| | | | 707/737 |

* cited by examiner

Desired Cluster: Cluster 108

Remove the following users:
- ☐ Bob
- ☐ Maria

Add the following users:
- ☐ Jeff
- ☐ Sarah

Other user: _____

[ Done ]

FIG. 3C

Recommendations for "Lunch"

Restaurant ABC

Finest vegetarian dining experience

*Maria is strictly vegetarian*

Delicious China Town

The most popular Chinese restaurant. Serves finest veg. and non-veg. Chinese delicacies.

*Maria does not prefer mixed restaurants, but simply loves Chinese food.*

Veggie XYZ

We offer all kinds of fast food especially for our vegetarian food lovers

*Not a favorite of Bob*

FIG. 6

001
SYSTEM AND METHOD FOR PROVIDING RECOMMENDATIONS

TECHNICAL FIELD

The present disclosure relates to a system and method for providing recommendations for an activity to a user in a cluster of users.

BACKGROUND

Internet websites, particularly search engines, have emerged as an attractive medium for advertisement of products, services, and the like. For example, when an Internet user conducts a search on a search engine, the search engine may provide the user search results as well as advertisements (hereinafter collectively referred to as recommendations) related to the search query. This gives the advertisers an opportunity to display their advertisements to the user when the user is actively seeking information on topics related to the advertised product or service.

Over the years, various advances in search technology have aimed to increase the relevance of recommendations to the user. This enhances the user experience. This also increases the likelihood of the user acting on the recommendations, such as clicking on a recommended advertisement or purchasing the recommended product or service. Personalized search and local search are two such notable advances.

Many popular Internet search engines provide personalized search functionality to customize the recommendations to the user's preferences. For example, if a user known to have an interest in wildlife conducts a search for "python", a personalized search engine will provide recommendations related to python snakes. On the other hand, if another user known to have an interest in programming languages conducts the same search, the personalized search engine will provide recommendations related to the Python programming language. The users may explicitly define such preferences for the personalized search engine. Alternatively, the personalized search engine may learn the user's preferences by observing the user's online behavior over a period of time and/or through other means.

On the other hand, local search allows users to conduct geographically constrained searches. For example, if a user conducts a local search for a "restaurant", the local search engine provides restaurants within, for example, the user's city or the user's locality. Local search has made the Internet a viable advertising medium for businesses that have a predominantly local clientele. Further, and perhaps more interestingly, local search has increasingly drawn users to conduct Internet searches for day-to-day activities such as finding eating establishments, movie shows, product showrooms, shopping options, banks, automated teller machines, bookstores, flower shops, real estate agents, and the like. Many known local search solutions use the user's current location, often derived by locating the user's mobile device using technologies such as Global Positioning System (GPS), cellular tower triangulation, and the like, to define the geographical constraints of the search.

Some known solutions offer a combination of personalized search and local search, that is, they provide recommendations that are geographically constrained as well as customized according to the user's preferences. For example, if a user known to like Chinese food searches for a "restaurant", the search engine gives a higher priority to Chinese restaurants in the user's vicinity vis-à-vis other restaurants. Users are increasingly using such solutions to obtain recommendations for their day-to-day activities.

However, in practice, users often seek recommendations for activities in which two or more people participate. For example, a user may want recommendations for a restaurant to meet two friends over lunch. Most present solutions provide results personalized to the user who conducted the search, and in most cases entirely neglect the preferences and/or the current location of other users participating in the activity. This reduces the relevance of the recommendations and therefore the likelihood of the user acting upon the recommendations. Therefore, there is a need for a more effective technique of providing recommendations for activities involving more than one user.

SUMMARY

The present invention provides methods, systems, and computer program products for providing recommendations for an activity to a user. In one embodiment, a process tracks status information of a plurality of users, and detects a trigger for providing recommendations for an activity. In response to the trigger, the process identifies a cluster of users based on the status information of the users. The process further retrieves profiles and behavioral characteristics of the users in the identified cluster, and provides one or more recommendations for the activity to the user based, at least in part, upon the behavioral characteristics and the profiles.

BRIEF DESCRIPTION OF THE DRAWINGS

FIG. 3C illustrate an example interface for a user to edit composition of the cluster according to one embodiment;

FIG. 6 illustrates an example recommendations page presented to the user according to one embodiment;

DETAILED DESCRIPTION

Figure 1:
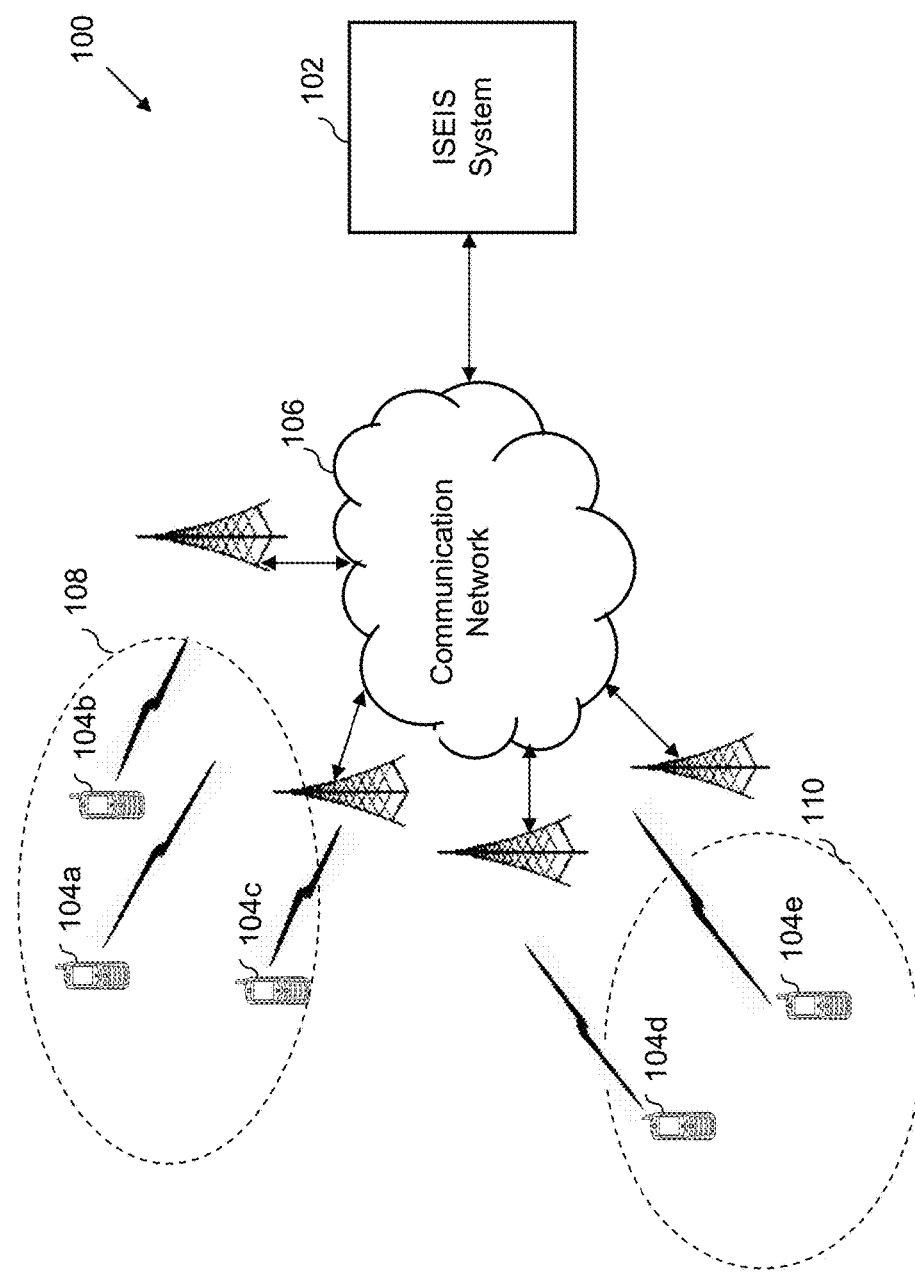
FIG. 1 illustrates an example network in which a system for providing one or more recommendations to a user may be deployed according to one embodiment.

Various embodiments of the present invention will be described in detail below with reference to accompanying drawings. It will be apparent, however, that these embodiments may be practiced without some or all of these specific details. In other instances, well known process steps or elements have not been described in detail in order not to unnecessarily obscure the description of the present invention. The following example embodiments and their aspects are described and illustrated in conjunction with apparatuses, methods, and systems which are meant to be illustrative examples, not limiting in scope.

Particular embodiments of the present invention provide systems and methods for providing one or more recommendations for an activity to a user. The systems and methods disclosed in conjunction with various aspects of the present invention are embodied in an Interactive Social Engineer Incentive System (ISEIS system). The nomenclature ISEIS system is only an example and used for descriptive purposes, and must not be construed to limit the scope of the present invention.

The ISEIS system provides recommendations for an activity, wherein the recommendations are customized for a cluster. The cluster is a grouping of two or more users that are currently in proximity of each other. The proximity may be physical, that is, the users are located within a pre-defined distance of each other. Alternatively, the proximity may be virtual, for example, the users participating in the same activity or currently interacting with each other over a network. The ISEIS system customizes recommendations based, at least in part, on profiles and behavioral characteristics of the users in the cluster. The profile of a user includes demographic information about the user, as well as the user's personal preferences such as likes and dislikes. The behavioral characteristics of a user in a cluster represent the social dynamics of that user in the cluster. The behavioral characteristics of a user include information such as how many times the preference of the user prevails in the decisions of the cluster, which other users in the cluster usually agree or disagree with the user, and so on. Therefore, the ISEIS system provides recommendations customized to the preferences of multiple users in a cluster, and the cluster's social dynamics. This increases the likelihood that the cluster will accept or act upon the recommendations. The recommendations may be generated by the ISEIS system, may be received from the users in the cluster, or both. In various embodiments, in addition to the recommendations the ISEIS system provides the user with additional information associated with the recommendation. The additional information may inform the user about the considerations that led the ISEIS system to present a particular recommendation and/or provide the user pointers to convince other users in the cluster to follow a recommendation aligned with the user's preference. The ISEIS system, in various embodiments, determines which recommendation the cluster accepts and may also give the user social or monetary incentives to convince other users in the cluster to accept a particular recommendation.

Example Network Environment

FIG. 1 illustrates an example network environment 100 in which various embodiments of the ISEIS system may be deployed. Network environment 100 includes an ISEIS system 102 that provides recommendations to one or more of a plurality of users, for example, users 104a (Steve), 104b (Bob), 104c (Maria), 104d (Jeff) and 104e (Sarah) shown in the figure. Users 104a-104e interact with ISEIS system 102 through a communication network 106 using client devices as shown in the figure.

Communication network 106 may include, but is not limited to, a Global System for Mobile (GSM) communications network, a Code Division Multiple Access (CDMA) network, a General Packet Radio Service (GPRS) network, a Wireless Local Area Network (WLAN, commonly known as WiFi), a Worldwide Inter-operability for Microwave Access (WiMAX) network, or a combination of two or more of the foregoing. In various embodiments, the client devices may interact with ISEIS system 102 using communication modes such as, but not limited to, GPRS, short messages (SMS), and the like. The client devices may be, for example, cellular telephones, personal digital assistants, laptop computers, palmtops, pocket PCs, desktop computers, and the like. A client device may execute one or more client applications, such as a web browser to access and view content over a computer network, an email client to send and retrieve emails and an instant messaging client for communicating with other users. Client devices 104a-104e, in some implementations, may also include Wireless Application Protocol (WAP) functionality and a WAP browser. The use of other wireless or mobile device protocol suites is also possible, such as NTT DoCoMo's i-mode wireless network service protocol suites, Enhanced Data Rates for GSM Evolution (EDGE) and the like. The client applications could be supported by various platforms including BlackBerry, Windows Mobile, Palm OS, Symbian, Linux and J2ME. Further, in one embodiment, one or more client devices of client devices 104a-104e include an ISEIS client application for interacting with ISEIS system 102. In another embodiment, one or more client devices of client devices 104a-104e interact with ISEIS system 102 through a web interface rendered using a web browser on the client device. In another embodiment, one or more client devices of client devices 104a-104e may use either or both of the ISEIS client application and the web interface to interact with ISEIS system 102.

Example System

Figure 2:
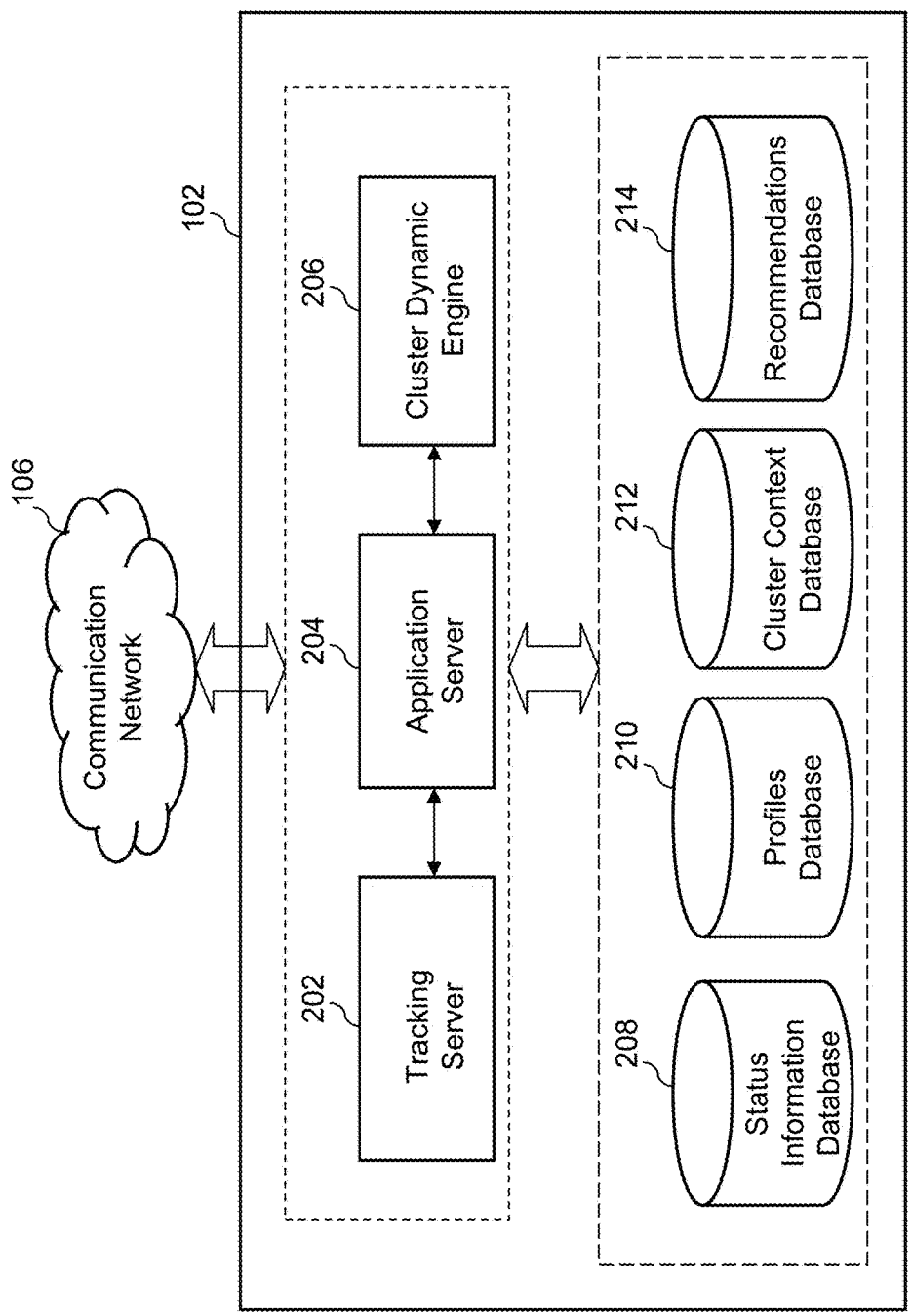
FIG. 2 is an example implementation of the system for providing one or more recommendations to a user according to one embodiment.

FIG. 2 illustrates an example implementation of ISEIS system 102 according to one embodiment. ISEIS system 102 includes a tracking server 202, an application server 204, and a cluster dynamic engine 206. In addition, ISEIS system 102 includes a status information database 208, a profiles database 210, a cluster context database 212, and a recommendations database 214.

Tracking server 202 tracks status information for a plurality of users. A user's status information includes information about that user's status, which may be used to generate recommendations for the user. Some examples of status information include, without limitation, location information, temporal information, social information, and activity information for the users. In one embodiment, the ISEIS client application tracks the status information in real time and transmits the status information to tracking server 202 via communication network 106. Tracking server 202 then stores the real-time status information in status information database 208. The status information already stored in status information database 208 for one or more users is treated as the historical status information for those users. In various embodiments, tracking server 202 may collect status information directly from the operator(s) or various service provider(s) (not shown) of communication network 106. For example, user 104*a* may authorize tracking server 202 to obtain the user's location information directly from the operator of communication network 106. On the other hand, tracking server 202 may receive a user's social information from the user's profile on a social networking website, or from the user's online calendar. It will be apparent to one skilled in the art, that tracking server 202 may gather a user's status information from any source, and through any medium, without deviating from the spirit and scope of the present invention.

The location information of a user represents a geographical position of the user and includes a current location, one or more locations visited by the user in the past, and the user's favorite places. The current location of a user is tracked by determining the current location of the user's client devices using various techniques known in the art, such as, Global Positioning System (GPS), cellular tower triangulation techniques, a network of Wi-Fi Access Points and Access Point location databases deployed by Skyhook Wireless, Inc. and so on. It will be apparent to a person skilled in the art that any technique of tracking location information may be used in conjunction with various embodiments without deviating from the spirit and scope of the present invention. The favorite places of the user may be explicitly entered by the user. Alternatively or in addition, the favorite places may be inferred from the historical pattern of the locations visited by the user.

The temporal information captures time-related aspects of the user's activities. The temporal information includes the time spent by the user with other users and/or at various locations, the time spent by the user on one or more activities, frequency of the one or more activities performed by the user, periodicity of the activities performed by the user (for example, every weekend, each morning etc.) and timestamps corresponding to one or more activities performed by the user. In an embodiment, the time information may be captured as absolute time, such as 10:00 AM or 1:15 PM. In another embodiment, time may be recorded in the form of logical time blocks such as morning, evening, lunch time, Monday, Thursday, weekday, weekend, and the like.

The social information includes information of the user's interaction with other users. Social information may include, for example, who the user is currently with or is frequently with, relationship of the user with other users (for example, colleague, friend, spouse, boss etc.), frequency and type of the user's interactions with other users, types of activities that the user conducts with other users, with which users a particular type of activity is conducted, time and frequency of such activities and so on. The social information may be explicitly entered by the user or may be inferred by the ISEIS client application or a combination thereof, based on location and temporal proximity, messaging activity between users and the like. The ISEIS client application infers the social information by tracking pattern and style of various interactions, such as instant messages, short messages, or calls, of the user with other users or a combination thereof.

The activity information includes information on the different types of activities the user performs, for example, shopping, dining out, watching movies, and the like, and information about events in which the user participates. In one embodiment, the activity information may be entered by the user. In another embodiment, the ISEIS client application, tracking server 202, or both generate the activity information using the user's location information, the user's calendar and communication such as emails or SMSes, and external data sources. For example, if the current location of a user is inside a movie theater for a duration of about two hours, the ISEIS client application or tracking server 202 may infer that the user is probably watching a movie at present. Further, the schedule of the movie theater may be used to determine which movie the user is watching. In additional embodiments, the activity information may also be inferred from the mention of a user in the other users' calendar or schedule information. For example, an entry "Lunch with Steve" in Bob's calendar may be used to infer that Steve was having lunch with Bob (activity information for Steve) even if such an entry is not present in Steve's calendar. It will be apparent to one skilled in the art, that numerous such context-specific criteria may be employed in conjunction with the present invention to infer the activities that the user participates in and to gather additional information about the activities. In various embodiments, ISEIS system 102 may prompt the user to confirm or correct the inferred activity information.

Application server 204 receives a trigger for providing one or more recommendations to a user. In various embodiments, application server 204 receives a search request from the user as the trigger for recommendations. For example, the ISEIS client application may present a search interface to the user. The user may enter one or more search terms, for example, "movies", in the search interface and submit a search. The ISEIS client application sends a corresponding search request to application server 204. Application server 204 may treat the search request as the trigger for providing recommendations, in this case, about "movies". In various embodiments, the ISEIS client application may access the user's calendar entries, short messages and e-mails for identifying scheduled activities of the user. For example, from Jeff's calendar "Monday: Lunch with user Sarah at 1:00 PM", the ISEIS client application detects that Jeff will be going out to lunch (that is, "activity") at 1:00 PM on Monday. The ISEIS application may send this information to application server 204 and application server 204 treats this information as the trigger for providing recommendations on "restaurants" or "food joints" to Jeff. Other triggers may include a threshold number of users that are amenable to being or have previously been clustered having been within a given location radius or each other at the same time.

Upon receiving the trigger for recommendations, cluster dynamic engine 206 accesses status information for a plurality of users to form one or more candidate clusters of users. A cluster is a grouping of two or more users that are currently in proximity of each other. The proximity may be physical, that is, the users are located within a pre-defined distance of each other. Alternatively, the proximity may be virtual, for example, the users participating in the same activity or currently interacting with each other. In other words, two or more users expected to participate in the activity for which recommendations are required are grouped in a single candidate cluster. In various embodiments, cluster dynamic engine 206 accesses the real-time status information for the users from tracking server 202. Cluster dynamic engine 206 also retrieves the historical status information for the users from status information database 208. Cluster dynamic engine 206 generates one or more candidate clusters based on either the real-time status information or the historical status information or both. Each candidate cluster includes the user to whom the recommendations for an activity are to be provided and one or more additional users expected to participate in the activity with the user. In various embodiments, the size of each candidate cluster may be restricted to a maximum limit, for example, up to 20 users.

In some embodiments, cluster dynamic engine 206 may use only the location information to generate the candidate clusters. For example, cluster dynamic engine 206 may form clusters of two or more users that are within a predefined proximity of each other. In another example, when a user is in her college, cluster dynamic engine 206 may assign the user to a candidate cluster containing her friends and when the user reaches home, the user is dynamically switched to another candidate cluster containing her family members. In some embodiments, cluster dynamic engine 206 may consider only the social information of the plurality of users while forming the candidate clusters, for example, two or more users who are currently exchanging multiple messages with each other may be grouped in one candidate cluster. In further embodiments, cluster dynamic engine 206 may also combine different types of the status information to determine the candidate clusters. For example, if multiple users (i.e. social information) always go out together on weekends (i.e. temporal information), cluster dynamic engine 206 will form a candidate cluster of these users on weekends. A person skilled in the art will appreciate that the status information may be used in a variety of other ways to identify the candidate clusters dynamically without deviating from the spirit and scope of the present invention.

In various embodiments, cluster dynamic engine 206 assigns a probability to each candidate cluster based upon the status information. The probability represents likelihood of users in the candidate cluster performing an activity together. In various embodiments, cluster dynamic engine 206 may attach varying degrees of importance to the location information, the temporal information, the social information, the activity information, and the like. For example, if Steve is with Bob (social information) and Steve's calendar entry indicates that Steve is scheduled to meet Maria over lunch (i.e. activity information) in about 30 minutes (i.e. temporal information), cluster dynamic engine 206 may give a higher probability to a candidate cluster containing Steve and Maria than a candidate cluster containing Steve and Bob.

In some embodiments, cluster dynamic engine 206 may assign a higher probability to candidate clusters generated using the historical status information than to candidate clusters generated using the real-time status information. Considering, for example, that the historical status information for Steve, Bob and Maria indicates that they are always together on weekends and the real-time status information indicates that on a particular weekend only Steve and Bob are together. In this case, cluster dynamic engine 206 will give a higher probability to a candidate cluster containing Steve, Bob and Maria than a candidate cluster containing Steve and Bob. Alternatively, if cluster dynamic engine 206 attaches more importance to the real-time status information, cluster dynamic engine 206 will assign a higher probability to the candidate cluster containing Steve and Bob than the candidate cluster containing Steve, Bob and Maria.

Figure 3A:
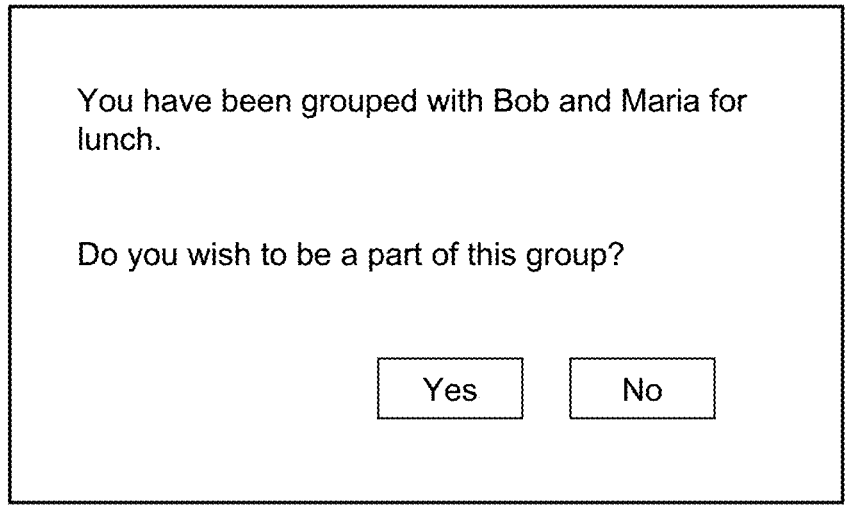
FIG. 3A illustrates an example interface for a user to accept being a member of a cluster according to one embodiment.
Figure 3B:
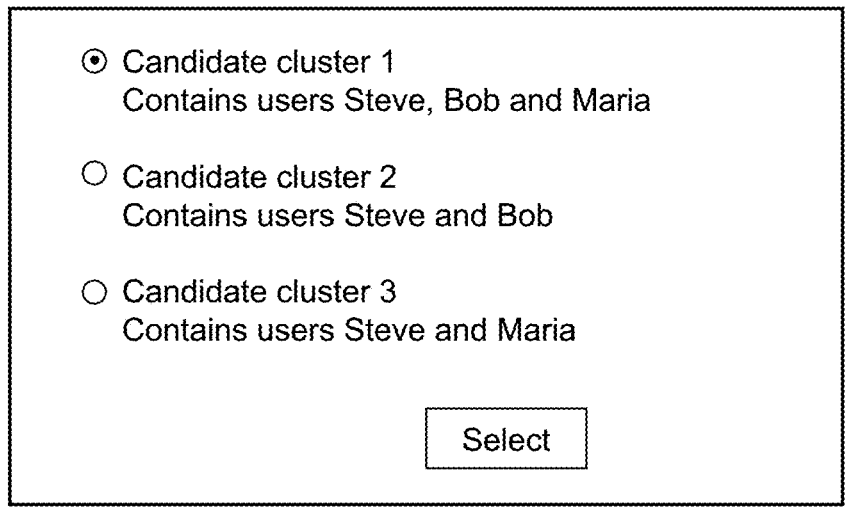
FIG. 3B illustrates an example interface for a user to select the cluster according to one embodiment.

In various embodiments, cluster dynamic engine 206 identifies a candidate cluster with the highest probability as a cluster for the user. According to some embodiments, once cluster dynamic engine 206 selects the identified cluster, cluster dynamic engine 206 may prompt each user in the identified cluster to accept being a member of the identified cluster optionally providing additional information about the identified cluster such as the activity for which the identified cluster is formed or the user that triggered the formation of the identified cluster. FIG. 3A illustrates one such example interface for a user to accept being a member of the identified cluster according to one embodiment. This provides an option to each user to opt out of the identified cluster. Cluster dynamic engine 206 then updates the identified cluster to exclude users that have opted out of the identified cluster. This may be useful in situations, for example, when a user is attending a conference, and cluster dynamic engine 206 groups the user with other users attending the conferences in a single cluster. In this case, the user may not want to be a part of a cluster with other users that are unknown to him and may opt out of this cluster. In various other embodiments, cluster dynamic engine 206 may prompt the user that requested the recommendations to select a cluster from among the candidate clusters. In this case, cluster dynamic engine 206 presents a list of the candidate clusters to the user. The list of candidate identifiers may optionally be arranged in a decreasing order of the probability. FIG. 3B shows an illustrative example of an interface for selecting the cluster. Cluster dynamic engine 206 then marks the selected candidate cluster as the identified cluster. In additional embodiments, cluster dynamic engine 206 may also provide an interface to the user to enable the user to edit the composition of the identified cluster. For example, once the user selects the identified cluster, the user may add and/or remove one or more other users in the identified cluster as shown in FIG. 3C for example purposes.

Once the identified cluster is identified, cluster dynamic engine 206 retrieves behavioral characteristics of the users in the identified cluster from cluster context database 212, according to one embodiment. Cluster context database 212 maintains the behavioral characteristics of users in all clusters. The behavioral characteristics of a user in a particular cluster include information representative of the social dynamics between users in the particular cluster. Behavioral characteristics may record, for example, which user is generally not responsive in the cluster, whose suggestions or recommendations are accepted by the cluster in a majority of cases, whether a particular user's suggestions are accepted by the cluster when the suggestions are associated with a particular activity, which user's suggestions or recommendations are accepted or neglected by a particular user, temporal or activity information associated with such instances, evidence of compromise or agreement on previous suggestions with one or more other users, frequency and situations when such a compromise or agreement occurred, and so on. For example, in cluster 108 (as depicted in FIG. 1), the behavioral characteristics include information such as, Bob's suggestions or recommendations are accepted by the cluster in 70% of the cases, Maria does not reply to messages containing suggestions from Steve, Bob relies on Maria's recommendations for movies in a majority of cases, Steve is successful in convincing Bob to purchase a product suggested by Maria in 80% of cases when Maria provides some incentives to Steve, and other similar information. The behavioral characteristics further include social points for every user in the cluster. The social points are a reification of the concept of "social capital" as an explicit point-based "currency" that the users can accrue based upon their activities and interactions within a cluster. In other words, the social points numerically represent a degree of influence a particular user may have within the cluster. In one embodiment, the social points may also represent a degree of influence a particular user has in another cluster of which the user is not a member, but to which the user is possibly transitively connected (for example, a friend of a friend). Every user has different social points corresponding to different clusters depending upon his influence within each cluster. In an example implementation, the higher the social points a user has, the greater is the influence of that user in the cluster. In various embodiments, the social points may be increased when the user's influence in the cluster increases based on the user's interactions, activity and social behavior in the cluster. In some embodiments, the social points may be decreased when the user's influence declines in the cluster. Various example scenarios for updating the social points are described later in detail. A person skilled in the art will recognize other examples of the behavioral characteristics representing the social dynamics between users in the cluster. In various embodiments, the behavioral characteristics may also include the historical status information of the users in the cluster.

Cluster dynamic engine 206 also retrieves profiles of the users in the identified cluster from profiles database 210. Profiles database 210 stores individual profiles of all user of ISEIS system 102. A profile of a user represents the user's preferences and includes information, such as a type of food or clothes the user likes, a favorite shop, places of interest, preferred music or movie genre, hobbies, favorite pastime activity etc. The profile further includes demographic information of the user, for example, age, gender, income range, profession, and the like. In various embodiments, the profile of the user may also store at least some part of the status information of the user, such as, without limitation, information about the user's current activities (for example, calendar information, location, and the like), and relationship of the user with other users (for example, spouse, co-worker, friend, friend's friend, and the like). It will be apparent to a person skilled in the art that numerous such variations may be employed for storing data such as the user profiles, behavioral characteristics, and status information, wherein such data or parts thereof may be combined into a single database or distributed over multiple databases without deviating from the spirit and scope of the present invention.

Figure 4:
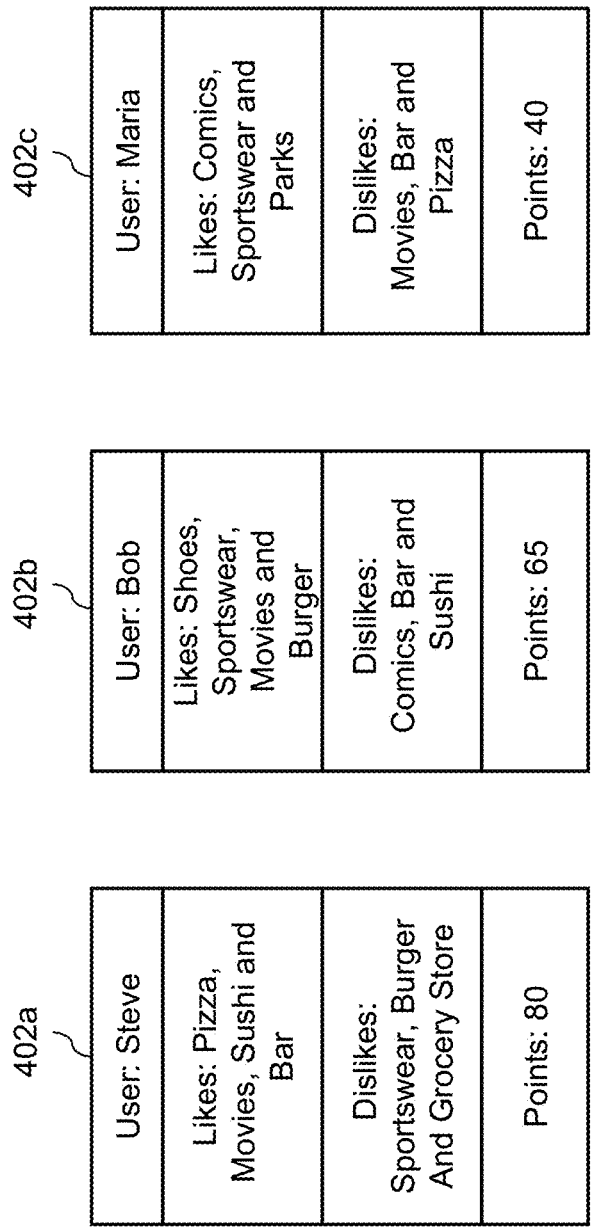
FIG. 4 illustrates example profiles of users in the cluster according to one embodiment.

FIG. 4 illustrates example profiles of Steve, Bob and Maria belonging to cluster 108. A profile 402a of Steve shows that Steve likes to eat pizzas and Sushi, watch movies and go to bars. Also, Steve dislikes eating burgers, visiting parks and wearing and buying sportswear. According to profile 402b of Bob, Bob likes to wear and buy shoes and sportswear, watch movies and eat burgers. Further, Bob dislikes reading comics, visiting bars and eating Sushi. Similarly, profile 402c of Maria indicates that Maria likes reading comics, visiting parks and buying and wearing sportswear. Further, Maria does not like to watch movies, visit bars and eat pizzas. In addition, FIG. 4 also shows the social points of all three users. In some embodiments, the preferences may be described in a more granular manner. For example, the profile may disclose that a user likes playing sports, and may further disclose that the user prefers playing tennis and football and dislikes playing hockey. A person skilled in the art will appreciate that a list of preferences mentioned above is for example purposes only and the profile may include other examples of preferences of the users instead of or in addition to the examples provided here. The information stored in the profiles may be used by application server 204 or by users in the identified cluster for persuasion or conflict resolution (in other words, as bargaining chips) as described later in the specification.

Application server 204 receives the behavioral characteristics, the profiles and the status information of the users in the identified cluster. In one embodiment, cluster dynamic engine 206 sends the behavioral characteristics, the profiles and the status information to application server 204. In another embodiment, cluster dynamic engine 206 sends the status information and the identifier cluster information to application server 204, and application server 204 then retrieves the behavioral characteristics and the profiles of the users in the identified cluster directly from cluster context database 212 and profiles database 210, respectively. Application server 204 then queries recommendations database 214 to obtain one or more recommendation results.

Figure 5:
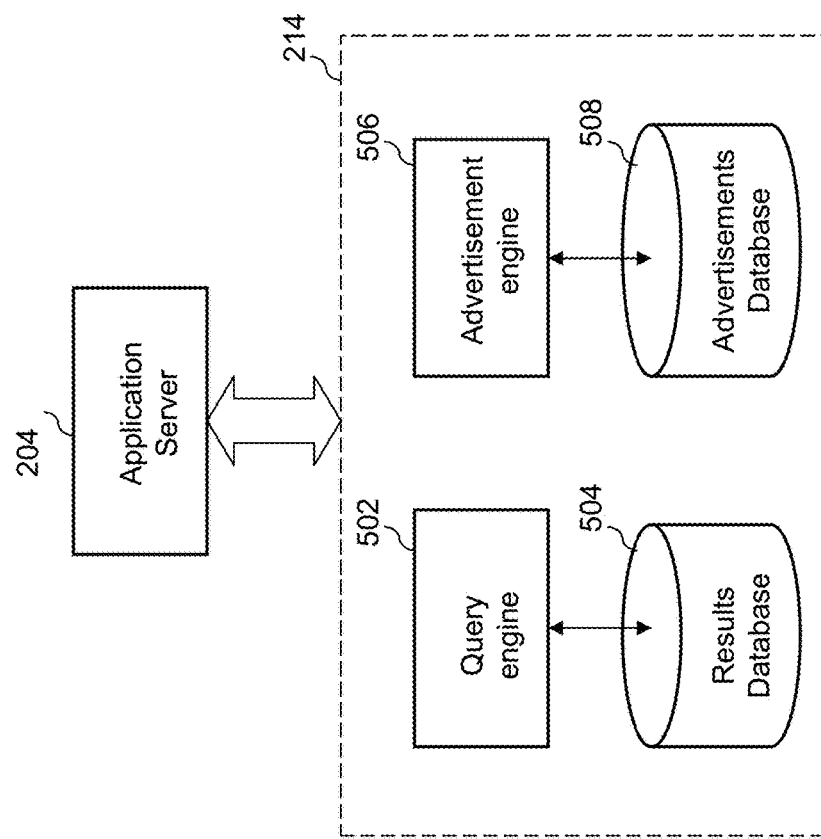
FIG. 5 illustrates an example implementation of a recommendations database according to one embodiment.

FIG. 5 illustrates an example implementation of recommendations database 214 according to one embodiment. Recommendations database 214 includes a query engine 502, a results database 504, an advertisement engine 506 and an advertisement database 508. Query engine 502 is coupled to results database 504 and advertisement engine 506 is coupled to advertisement database 508. Advertisement database 508 stores a plurality of recommendation options that are sponsored by one or more advertising partners of ISEIS system 102. Results database 504 stores a plurality of recommendation options that are not sponsored by the one or more advertising partners of ISEIS system 102. The one or more recommendation options may recommend an activity, a product, a service, a website, a place of interest, a shop, multimedia content, a business and the like. In some embodiments, the one or more recommendation options may also recommend social connections, for example, other users to be contacted for participating in a recommended or scheduled activity.

Application server 204 sends a query including parameters extracted from the profiles of the users in the identified cluster to query engine 502. Query engine 502 queries results database 504 to obtain one or more search-result based recommendation results relevant to the query. Application server 204 may also query advertisement engine 506 to obtain advertisement based recommendation results. Advertisement engine 506 queries advertisement database 508 to obtain one or more advertisements that are relevant to the query. Query engine 502 and advertisement engine 506 employ various database querying techniques known in the art for querying results database 504 and advertisement database 508, respectively.

With reference to FIG. 2 again, application server 204 uses different parameters extracted from the profiles and the behavioral characteristics of the users in the identified cluster in the query. Application server 204 may use the behavioral characteristics information, the social points, and the profiles of the users and the status information of the users in a variety of ways. For example, application server 204 generates some of the recommendations based on the profile of a user, for example, Steve, having the maximum social points in the cluster. In another example, application server 204 generates some of the recommendations based on the profile of a user, for example, Maria, who influences Steve the most. In yet another example, the search query may not include any constraints drawn from the profile of a user whose suggestions are least accepted by other users in the cluster.

In additional embodiments, application server 204 also receives one or more suggestions for a user in the identified cluster from the users in the identified cluster. The other users in the cluster may generate these suggestions for the user based upon their knowledge and understanding of the user.

The one or more recommendation results and the one or more suggestions, hereinafter collectively referred to as the recommendation results, thus obtained include one or more search-result based recommendation results obtained from results database 504 and one or more advertisement based recommendation results obtained from advertisement database 508. Once application server 204 receives the one or more recommendation results from recommendations database 214, application server 204 ranks the one or more recommendation results based, at least in part, upon the behavioral characteristics and the profiles of the users in the identified cluster. For example, if according to the behavioral characteristics, Maria influences Steve more than Bob influences Steve, then a recommendation result associated with the profile of Maria may be ranked higher than a recommendation result associated with the profile of Bob. In another example, a recommendation result based on the profile of a user that influences the decision of cluster 108 most is ranked higher than a recommendation result based on the profile of another user. According to one embodiment, application server 204 may only consider the profiles of Steve, Bob and Maria while determining the ranking of the recommendation results. For example, consider that Steve and Bob like football and tennis, whereas Maria likes baseball and Steve sends a query about sportswear, then an advertisement for a jersey of a favorite football club of Bob may be ranked higher than an advertisement for a jersey of a favorite baseball club of Maria. In another embodiment, application server 204 may consider the desired time of the activity while ranking the recommendations. For example, when a cluster comprising three women searches for a recommendations for a "bar", application server 204 may rank a first bar higher on Saturdays because it is known to be popular on weekends, but rank a second bar higher on Wednesdays because the second bar has "Ladies Night" on Wednesdays. A person skilled in the art will appreciate that the scenarios mentioned above are for example purposes only, and that the behavioral characteristics and the profiles of the users may be used in a variety of other ways to rank the results.

In some embodiments, application server 204 also takes into account a cluster model to rank the one or more recommendation results. The cluster model may be, for example, a cooperative model or a competitive model. In the cooperative model, application server 204 assigns a higher rank to recommendations that match Steve's profile more closely. The cooperative model may be used to find recommendations that may be considered favorable by the maximum number of users. On the other hand, in the competitive model, application server 204 assigns a higher rank to recommendations that do not match Steve's profile. The competitive model may be used to find recommendations that induce a gaming aspect to the final decision of the cluster, where the users may compete with each other to convince other users to decide in favor of recommendations aligned with their own respective personal preferences. For example, if Steve likes to eat Chinese and continental food, whereas Bob favors Chinese food and Sushi, then application server 204 gives a higher ranking to a recommendation result recommending a Chinese food joint to Steve according to the cooperative model. On the other hand, in the competitive model, the one or more recommendations that do not match the profile of Steve are given a higher rank. Considering the same example, application server 204 will now rank a recommendation result giving information about a Sushi bar to Steve higher under the competitive model. Further, in some embodiments, application server 204 may apply different cluster models while ranking recommendation results for different users. For example, application server 204 may employ the cooperative model when ranking recommendation results for Steve, and apply the competitive model for ranking recommendation results for Maria. In further embodiments, application server 204 may use a different cluster model to rank recommendation results to the same user at different times. In additional embodiments, the one or more recommendations may include recommendations based on the cooperative model as well as recommendations based on the competitive model.

In additional embodiments, one or more recommendations for users of the identified cluster may also be based on another similar cluster. In this case, cluster dynamic engine 206 identifies the similar cluster based on the profiles of the users belonging to the identified cluster such that the profiles of the users belonging to the identified and similar clusters substantially match with each other. For example, the users of the identified cluster and the similar cluster may share substantially similar demographic profile or may have substantially similar preferences. The users in the identified cluster and the users in the similar cluster may reside in the same city or in different cities. In some embodiments, the users in the similar cluster may also reside in a different state or even a different country.

Application server 204 then queries recommendations database 214 using the status information and profiles of the users in the similar cluster and provides the recommendations thus generated to the identified cluster. For example, consider that cluster 108 is the identified cluster, or in other words the cluster that is seeking recommendations. Further, cluster 110 is identified to be similar to cluster 108 because users in both clusters like the same rock groups, enjoy Japanese food, and play the same sports. Application server 204 may then give a higher ranking to a particular restaurant that is frequented by cluster 110 while generating recommendations for cluster 108. In another example, if cluster 108 is visiting cluster 110's city, application server 204 recommends bars, restaurants or shops frequented by cluster 110 to cluster 108. In one embodiment, application server 204 may also generate recommendations by predicting or inferring the likes of the users in cluster 108 from the profiles of the users in similar cluster 110. For example, application server 204 may recommend an action movie to cluster 108 because cluster 110 enjoys watching action movies, even if the profiles of the users in cluster 108 provide no information on their favorite movie genre.

Application server 204 prepares a recommendations page including links corresponding to the one or more recommendations. FIG. 6 illustrates an example recommendations page according to one embodiment. The one or more recommendations may be arranged in a decreasing order of ranking, according to one embodiment. In one embodiment, application server 204 presents the recommendations page to the user in the web browser residing on the client device. In another embodiment, application server 204 sends the recommendations page to the ISEIS client application and the ISEIS client application displays the recommendations page to the user in a user interface of the ISEIS client application. The recommendations page may optionally contain additional information about the recommendations. The additional information may inform the user of one or more factors considered by application server 204 to provide the recommendations. For example, if Steve in cluster 108 has requested recommendations for "dinner restaurants", the recommendations page generated in response to the request may contain additional information that all recommendations are vegetarian restaurants because Maria is strictly vegetarian. This information is available to application server 204 from Maria's profile. Alternatively, depending on Maria's privacy settings, application server 204 may only inform Steve that all recommendations are vegetarian restaurants because one member of the cluster is vegetarian, without explicitly identifying Maria. Further, the recommendations page may contain tips for the user to help the user influence the outcome of the decision negotiation. In the above example, the recommendations page may further inform Steve that Maria, upon persuasion, may be amenable to dining at a mixed restaurant (that is, one that serves both vegetarian and non-vegetarian food) even though Maria's preferences are set for only pure vegetarian restaurants. Application server 204 may get this information from Maria's historical status information and/or behavioral characteristics. This information is helpful for Steve to influence the outcome.

In another embodiment, the user may also use the additional information to convince other users in the identified cluster to do what the user prefers. For example, consider Jeff and Sarah in a cluster. Jeff sends a query for "restaurant tacos". Query engine 502 returns recommendation results containing information about all restaurants in the vicinity serving tacos. Advertisement engine 506 sends advertisements of different brands of tacos. Application server 204 determines that Jeff is with Sarah and Sarah does not like to eat tacos, but likes to buy chocolates. Application server 204 then looks for a chocolate shop next to one of the tacos restaurants provided by query engine 212, and finds restaurant ABC. In one example implementation, application server 204 may treat the result containing information about restaurant ABC as more relevant than other results. Application server 204 then sends additional information, such as "Sarah likes to buy chocolates and there is a chocolate shop next to restaurant ABC" to Jeff along with the information about restaurant ABC. Jeff may use the additional information to make Sarah accompany him to restaurant ABC, for example, Jeff may bargain with Sarah to come to restaurant ABC in lieu of Jeff accompanying her to the chocolate shop next door.

Additionally, for example, consider Steve, Bob and Maria having profiles as described in conjunction with FIG. 4. Assume that Steve and Bob are making plans for lunch together, and Steve recommends eating sushi and Bob recommends eating a burger. This results in a conflict since Steve dislikes burgers whereas Bob hates sushi. Application server 204 may recommend a pizza joint to resolve this conflict by inferring from the profiles of Steve and Bob that while Steve likes pizza, Bob has no particular preference regarding pizzas. In another example, consider Bob wants to buy shoes and would like Maria to accompany him. In this case, application server 204 may send the profile information to Bob who in turn may use it to persuade Maria to accompany him to a shoe store in lieu of Bob accompanying Maria to a nearby park.

It will be apparent to one skilled in the art that a variety of additional information may be included in the recommendations page without deviating from the spirit and scope of the present invention.

In a similar manner, application server 204 may provide recommendations to other users of the identified cluster. In some embodiments, application server 204 provides the same recommendations to all users in the identified cluster. Alternatively, application server 204 provides different recommendations to different users in the identified cluster. Further, in some embodiments, application server 204 may apply different cluster models while providing recommendations to different users. For example, application server 204 may employ the cooperative model when providing recommendations to Steve and apply the competitive model for providing recommendations to Bob.

Thereafter, ISEIS system 102 tracks an outcome of the one or more recommendations provided to the user. The outcome of the one or more recommendations may be an activity performed by the user to whom the one or more recommendations were provided. Such activity may be, for example, without limitation, viewing a recommended advertisement, clicking on the links inserted in the one or more recommendations, purchasing a recommended product, downloading content from a recommended content sharing website etc. Alternatively, or in addition, the outcome of the one or more recommendations may be an activity undertaken by users in the identified cluster, for example, visiting a recommended place of interest, visiting a recommended shop, making a purchase at the recommended shop, and the like. In some embodiments, the ISEIS client application is configured to track online activity, for example, online credit card transactions, visits to websites etc., of the users in the cluster to determine the outcome. Further, in some embodiments, the ISEIS client application is also configured to track whether the users in the identified cluster have visited the recommended place of interest or the recommended shop and so on. In alternate embodiments, tracking server 202 tracks the status information of the users in the identified cluster to monitor the outcome. The ISEIS client application and tracking server 202 send the tracked outcome to application server 204.

Based on the outcome, application server 204 decides to provide incentives to one or more users in the identified cluster. Application server 204 may also consider additional information, such as type of recommendation provided to the user, ranking of the recommendation acted upon etc. The incentives are social incentives, monetary incentives or both. In one embodiment, the social incentives are provided in terms of the social points in the individual profiles of the users in the cluster. Examples of monetary incentives include, but are not limited to, discount coupons, credit card cash-back scheme and the like. The monetary incentives may be provided in a variety of ways, such as sending a special code to the client device in a text message, delivering discount coupons to the user's address, printing a code on a purchase receipt and so on. The user can then avail himself or herself of the monetary incentive by presenting the discount coupon at the shop, or by entering the special code in a machine installed at the shop etc.

In one example situation, if Steve is recommended a shop that is a favorite of Bob's and Steve visits the recommended shop, then application server 204 provides incentives to Bob. If Steve also makes a purchase at the recommended shop, application server 204 may provide additional incentives to Bob. In one embodiment, if application server provides social incentives to the user, application server 204 may add 50 points to Bob's profile if Steve visits the recommended shop and add 100 points if Steve actually makes the purchase. A person skilled in the art may appreciate that any other suitable point scheme may be used without deviating from the spirit and scope of the present invention. In an alternate embodiment, if application server 204 chooses to provide monetary incentives, application server 204 may send a discount coupon of 10% to Bob. In some embodiments, Bob may also opt to inform ISEIS system 102 to give incentives to Steve for acting upon recommendations based on Bob's profile.

In another example case, if Steve was recommended a first movie and Bob was recommended a second movie based on Maria's profile and they all watched the second movie, then application server 204 may add 500 points to Bob's social points and add 100 points to Maria's social points. In one embodiment, application server 204 may also decrease 50 points from Steve's social points to provide a social disincentive to Steve for failing to influence cluster 108. Thus, the social points may be reduced in response to various factor including, without limitation, failure to exert influence in the cluster, or recommending an activity (or a location, a product and the like) that is not acted upon and the like. In one embodiment, ISEIS system 102 may also opt to provide monetary incentives to Bob and Maria instead of or in addition to the social incentives. The illustrative incentive schemes described above are for example purposes only and a person skilled in the art will appreciate that any other schemes for providing social and monetary incentives to the user may be implemented without deviating from the spirit and the scope of the invention.

In further embodiments, application server 204 updates profiles, the behavioral characteristics and the status information of the users in the identified cluster based upon the tracked outcome.

Example Process

Figure 7:
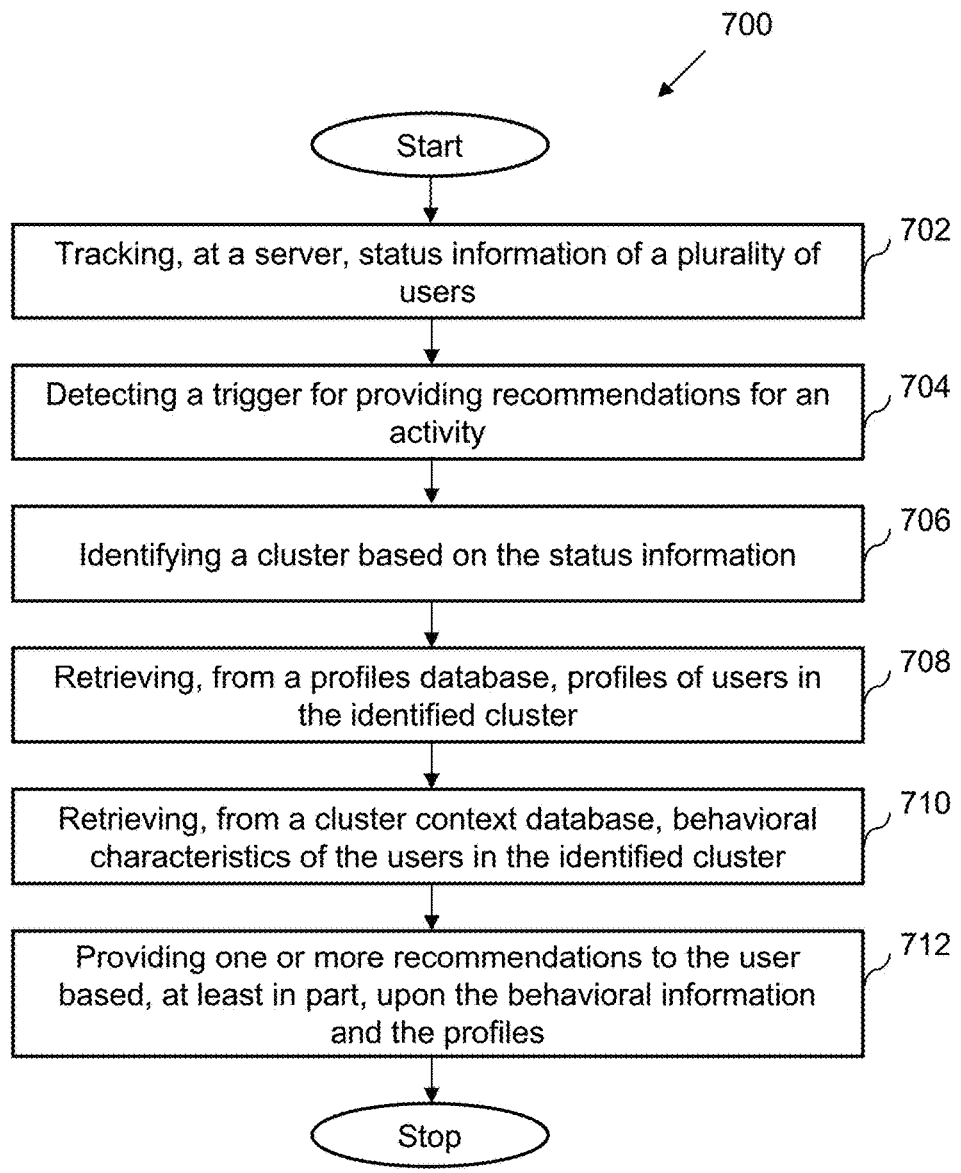
FIG. 7 is a flowchart illustrating an example method for providing one or more recommendations to a user according to one embodiment.

FIG. 7 illustrates an example process 700 for providing recommendations for an activity to a user according to one embodiment. At step 702, status information of a plurality of users is tracked at a server. In one embodiment, tracking server 202 tracks the status information of the plurality of users. Thereafter, at step 704, a trigger for providing the recommendations for the activity is detected. Upon detecting the trigger at step 704, a cluster of users is identified based upon the status information at step 706. The identified cluster includes the user and one or more additional users. In one embodiment, cluster dynamic engine 206 identifies the identified cluster.

Thereafter, at step 708, profiles of the users in the identified cluster are retrieved from a profiles database, for example, profiles database 210. Thereafter, at step 710, behavioral characteristics of the users in the identified cluster are retrieved from a cluster context database, such as cluster context database 212. Thereafter, at step 712, one or more recommendations for the activity are provided to the user. The one or more recommendations are based, at least in part, on the profiles and the behavioral characteristics. In various embodiments, the one or more recommendations are also based upon a cluster model. The cluster model may be a cooperative or a competitive model. The one or more recommendations include search-result based recommendations, advertising based recommendations or both.

Figure 8:
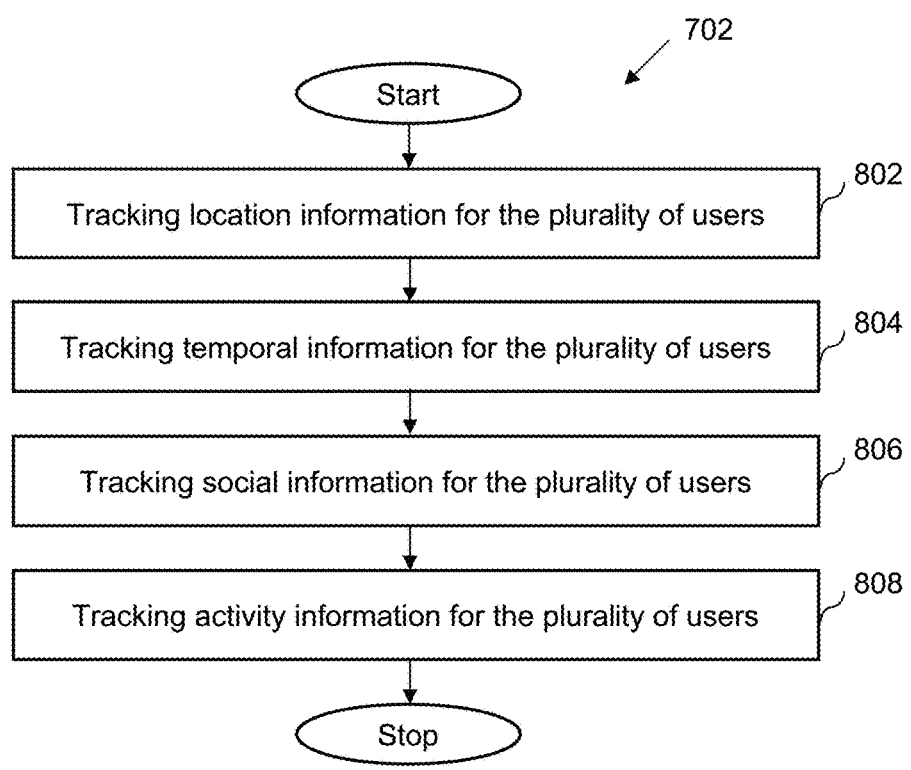
FIG. 8 is a flowchart illustrating an example method for tracking status information of a plurality of users according to one embodiment.

FIG. 8 is a flowchart illustrating an example implementation of step 702 for tracking the status information of the plurality of users according to one embodiment. At step 802, location information for the plurality of users is tracked. The location information for a user represents a geographical position of the user and includes a current location and one or more locations visited by the user in the past. At step 804, temporal information for the plurality of users is tracked. The temporal information captures time-related aspects of the user's activities. The temporal information includes a current time, time spent with other users, time spent on one or more activities, timestamps corresponding to one or more activities performed by the user, frequency of the one or more activities. At step 806, social information is tracked for the plurality of users. The social information includes information on the user's interaction with other users. Social information may include, for example, who the user is currently with or is frequently with, frequency and type of the user's interactions with other users, types of activities that the user conducts with other users, with which users a particular type of activity is conducted, time and frequency of such activities and so on. At step 808, activity information is tracked for the plurality of users. The activity information includes different types of activities the user performs, for example, shopping, dining out, watching movies etc. and information about events, in which the user participates or is currently participating. In some embodiments, all steps 802-808 are performed for tracking the status information of the plurality of users. In other embodiments only one of steps 802-808 may be performed to track the status information. In further embodiments, only a few of steps 802-808 may be performed.

Figure 9:
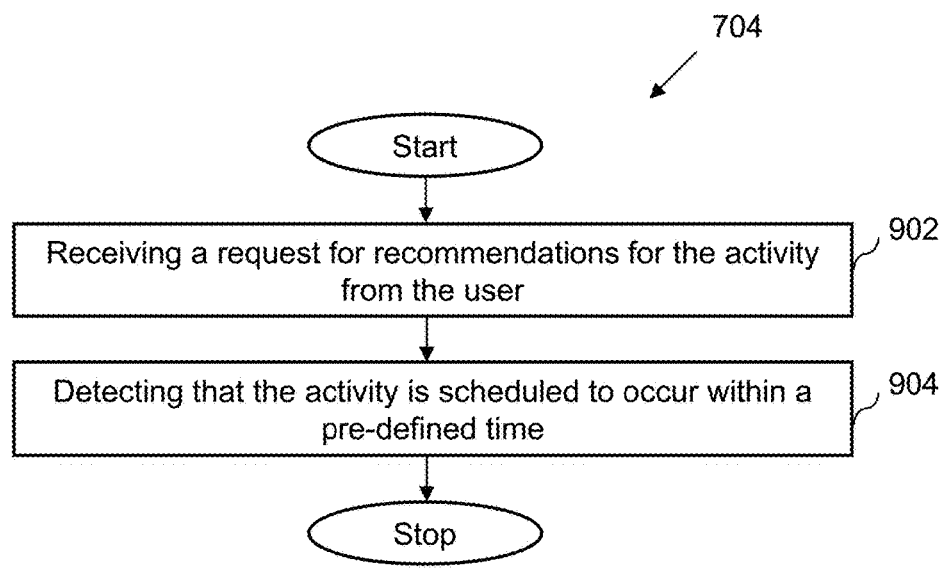
FIG. 9 is flowchart illustrating an example method for detecting a trigger for providing recommendations for an activity according to one embodiment.

FIG. 9 is a flowchart illustrating an example implementation of step 704 for detecting the trigger for providing recommendations for the activity according to one embodiment. At step 902, a request for recommendations for the activity is received from the user. In one embodiment, application server 204 receives the request. At step 904, an activity that is scheduled to occur within a pre-defined time is detected. Application server 204 detects the scheduled activity according to one embodiment. In various embodiments, only the request is received (step 902) or the scheduled activity is detected (step 904) or both.

Figure 10:
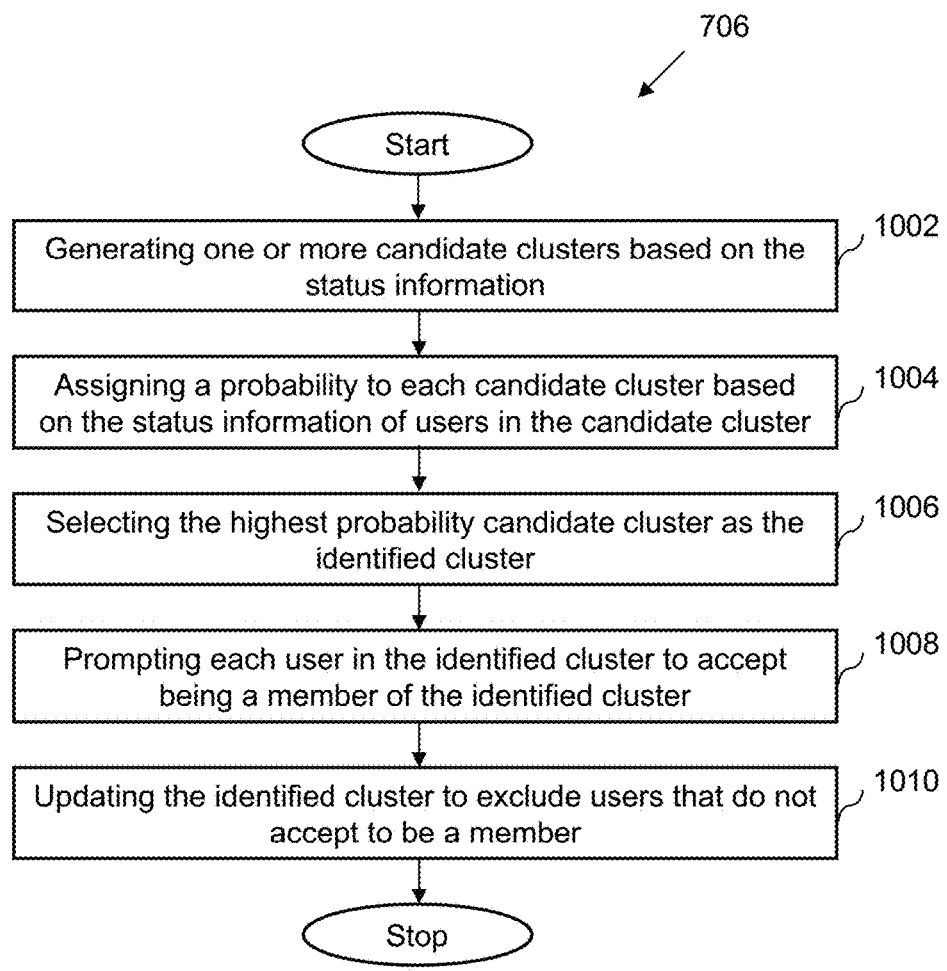
FIG. 10 is a flowchart illustrating an example method for identifying a cluster according to one embodiment.

FIG. 10 is a flowchart illustrating an example implementation of step 706 for identifying the identified cluster according to one embodiment. At step 1002, one or more candidate clusters are generated based on the status information of the plurality of users. Thereafter, at step 1004, a probability is assigned to each candidate cluster using the status information of users in the candidate clusters. Thereafter, at step 1006, a candidate cluster with the highest probability is selected as the identified cluster. Thereafter, at step 1008, each user in the identified cluster is prompted to accept being a member of the identified cluster. At this stage, any user in the identified cluster may not want to be a member of the identified cluster and may choose to opt out of the identified cluster. Responses of all users in the identified cluster are collected. Thereafter, at step 1010, the identified cluster is updated to exclude users that do not accept to be a member of the identified cluster.

Figure 11:
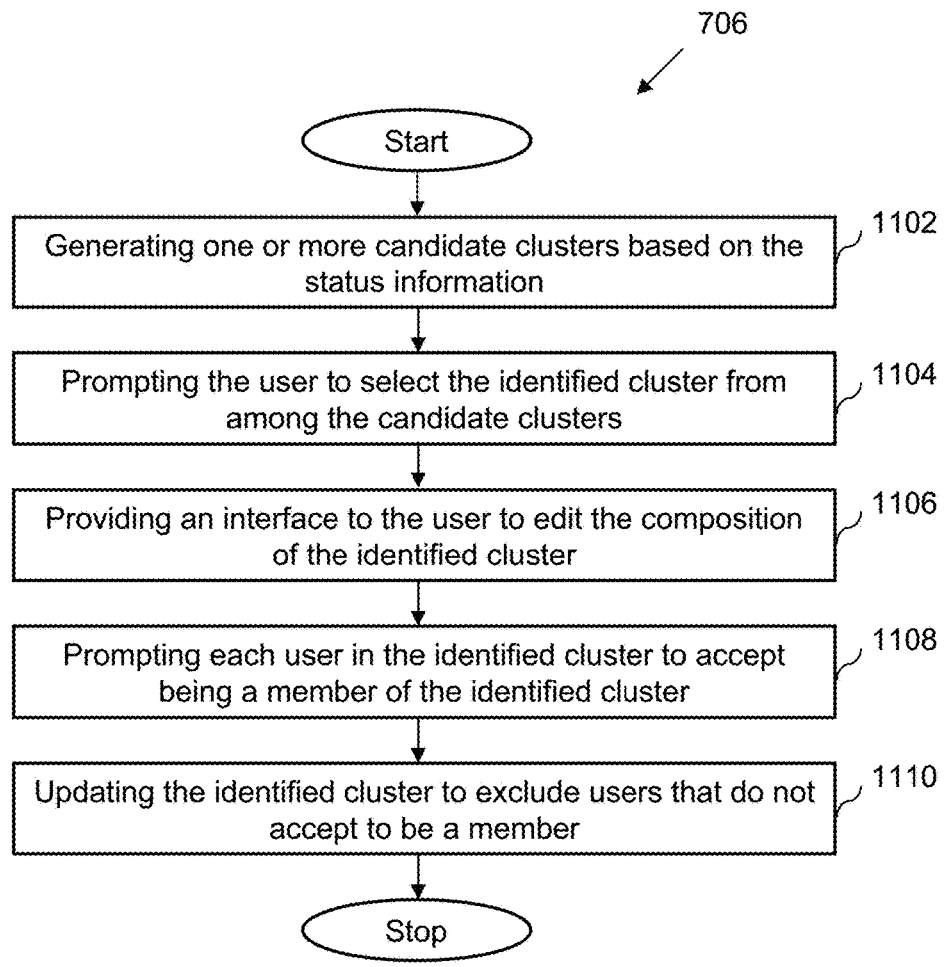
FIG. 11 is a flowchart illustrating another example method for identifying the cluster according to one embodiment.

FIG. 11 is a flowchart illustrating another example implementation of step 706 for identifying the identified cluster according to one embodiment. At step 1102, one or more candidate clusters are generated based on the status information of the plurality of users. Thereafter, at step 1104, the user is presented with a list of candidate identifiers and is prompted to choose the identified cluster from among the candidate clusters. Thereafter, at step 1106, the user may also be provided an interface to enable the user to edit the compositions of the identified cluster. For example, the user may add and/or remove particular users from the identified cluster. Thereafter, at step 1108, each user in the identified cluster is prompted to accept being a member of the identified cluster. At this stage, any user in the identified cluster may not want to be a member of the identified cluster and may choose to opt out of the identified cluster. Responses of all users in the identified cluster are collected. Thereafter, at step 1110, the identified cluster is updated to exclude users that do not accept to be a member of the identified cluster.

Figure 12:
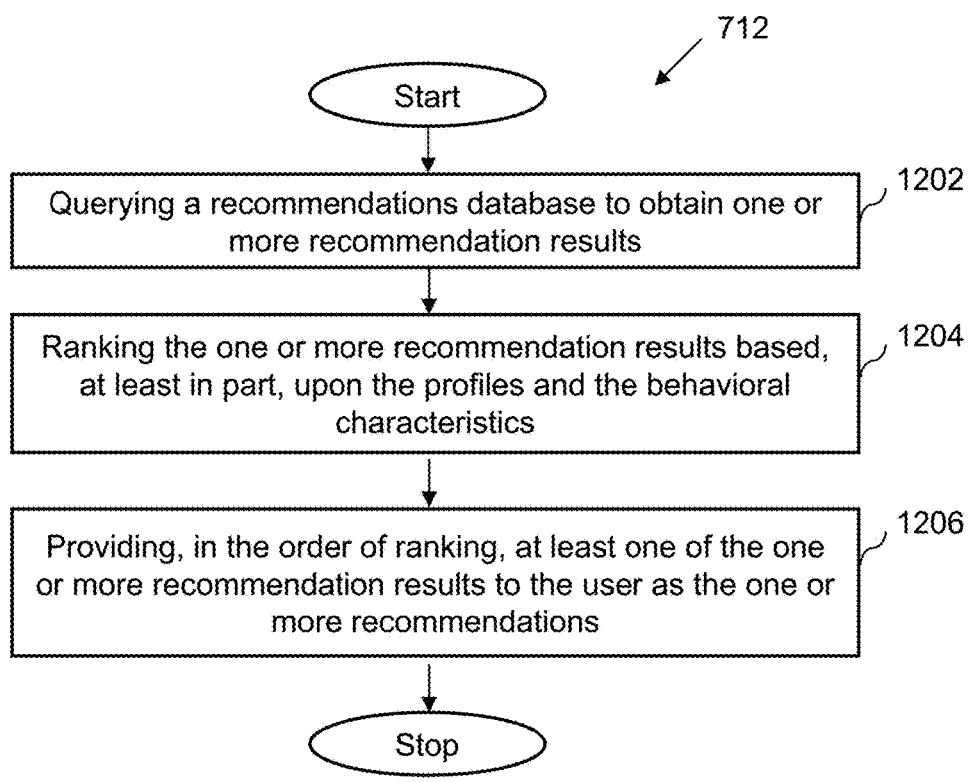
FIG. 12 is a flowchart illustrating an example method for providing one or more recommendations according to one embodiment.

FIG. 12 is a flowchart illustrating an example implementation of step 712 for providing one or more recommendations for the activity according to one embodiment. At step 1202, a recommendations database is queried to obtain one or more recommendation results. Parameters drawn, at least in part, from the behavioral characteristics and the profiles are used to query the recommendations database. Thereafter, at step 1204, the one or more recommendation results are ranked based, at least in part, on the profiles and the behavioral characteristics. In some embodiments, the cluster model may also be additionally used to rank the one or more recommendation results. Thereafter, at step 1206, at least one of the one or more recommendation results is provided to the user as the one or more recommendations in the order of the ranking.

Figure 13:
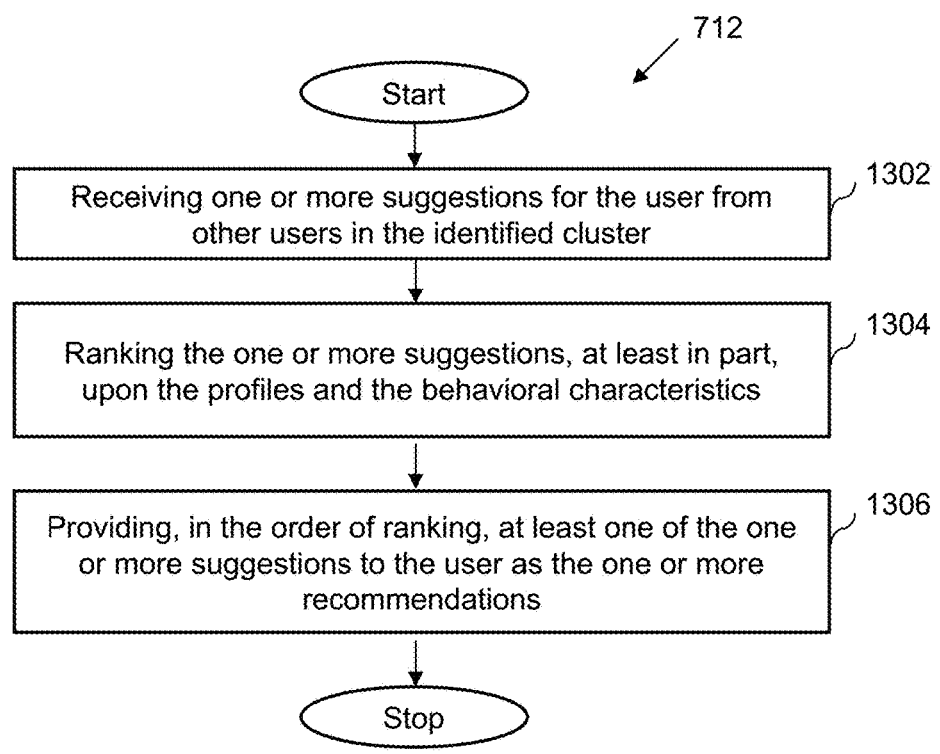
FIG. 13 is a flowchart illustrating another example method for providing one or more recommendations according to one embodiment.

FIG. 13 is a flowchart illustrating an example implementation of step 712 for providing one or more recommendations for the activity according to one embodiment. At step 1302, one or more suggestions for the user are received from other users in the identified cluster. Thereafter, at step 1304, the one or more suggestions are ranked based, at least in part, on the profiles and the behavioral characteristics. In some embodiments, the cluster model may also be additionally used to rank the one or more suggestions. Thereafter, at step 1306, at least one of the one or more suggestions is provided to the user as the one or more recommendations in the order of the ranking.

Figure 14:
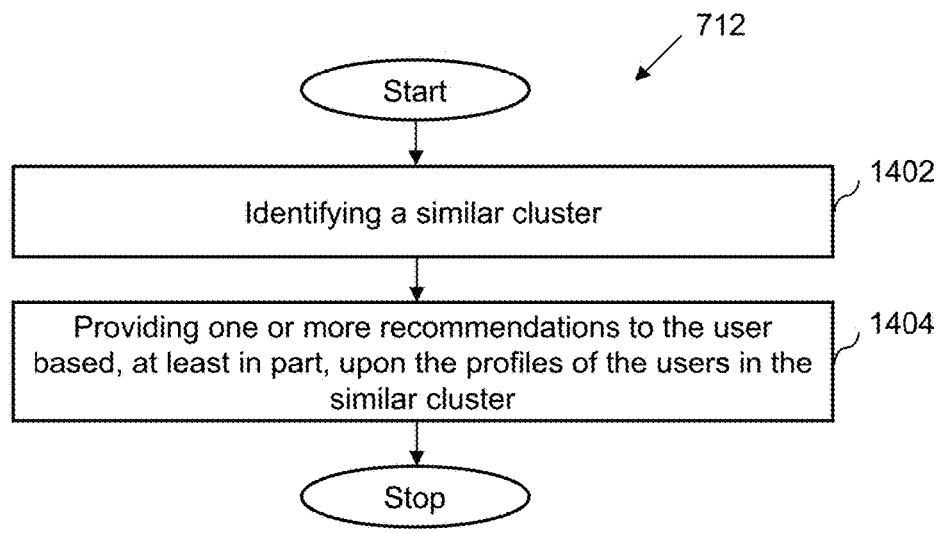
FIG. 14 is a flowchart illustrating an example method for providing one or more recommendations depending upon a similar cluster according to one embodiment.

As mentioned earlier, according to some embodiments, ISEIS system 102 may also provide recommendations to users of a cluster based on profiles of users in other clusters. FIG. 14 is a flowchart illustrating another example implementation of step 712 for providing one or more recommendations for the activity based upon the profiles of the users in other clusters according to one embodiment. At step 1402, a similar cluster to the identified cluster is identified such that the profiles of users in the similar cluster are substantially similar to the profiles of the users in the identified cluster. Thereafter, at step 1404, the one or more recommendations are provided to the user in the identified cluster based, at least in part, upon the profiles of the users in the similar cluster.

Figure 15:
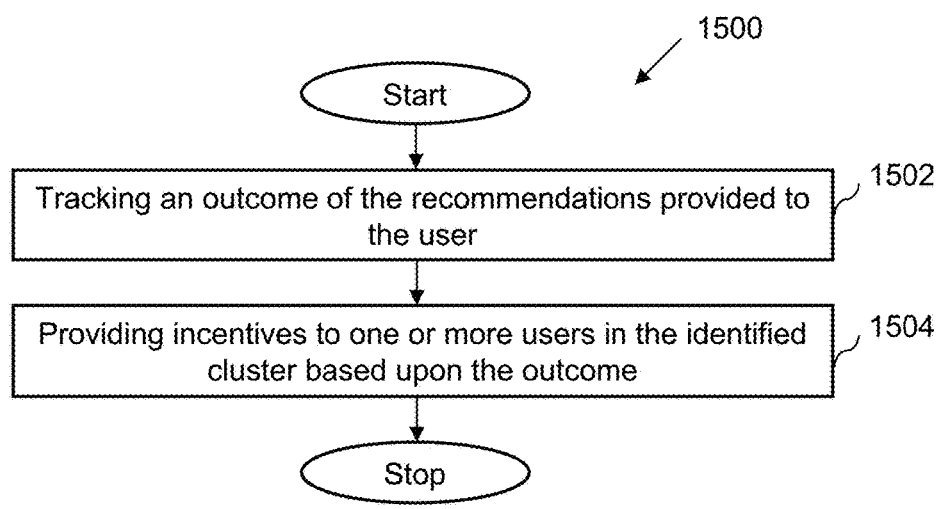
FIG. 15 is a flowchart illustrating an example method for providing incentives to one or more users of the cluster according to one embodiment.

In various embodiments, ISEIS system 102 may also provide incentives to users in the identified cluster for acting upon recommendations provided to the users in the identified cluster. FIG. 15 is a flowchart illustrating an example process 1500 for providing incentives to one or more users according to one embodiment. At step 1502, an outcome of the recommendations provided to the user is tracked. The outcome of the one or more recommendations may be an activity performed by the user to whom the one or more recommendations were provided. Such activity may be, for example, without limitation, viewing the recommended advertisement, clicking on the links inserted the one or more recommendations, purchasing the recommended product, downloading content from the recommended content sharing website etc. Alternatively, or in addition, the outcome of the one or more recommendations may be an activity undertaken by users in the identified cluster, for example, visiting the recommended place of interest, visiting the recommended shop, making a purchase at the recommended shop, and the like. Thereafter, at step 1504, incentives are provided to one or more users in the identified cluster based upon the outcome. The incentives are social incentives, monetary incentives or both. In one embodiment, the social incentives are provided in terms of the social points in the individual profiles of the users in the identified cluster. Examples of monetary incentives include, but are not limited to, discount coupons, credit card cash-back scheme and the like. The monetary incentives may be provided in a variety of ways, such as sending a special code to the client device in a text message, delivering discount coupons to the user's address, printing a code on a purchase receipt and so on. The user can then avail of the monetary incentive by presenting the discount coupon at the shop, or by entering the special code in a machine installed at the shop etc.

Figure 16:
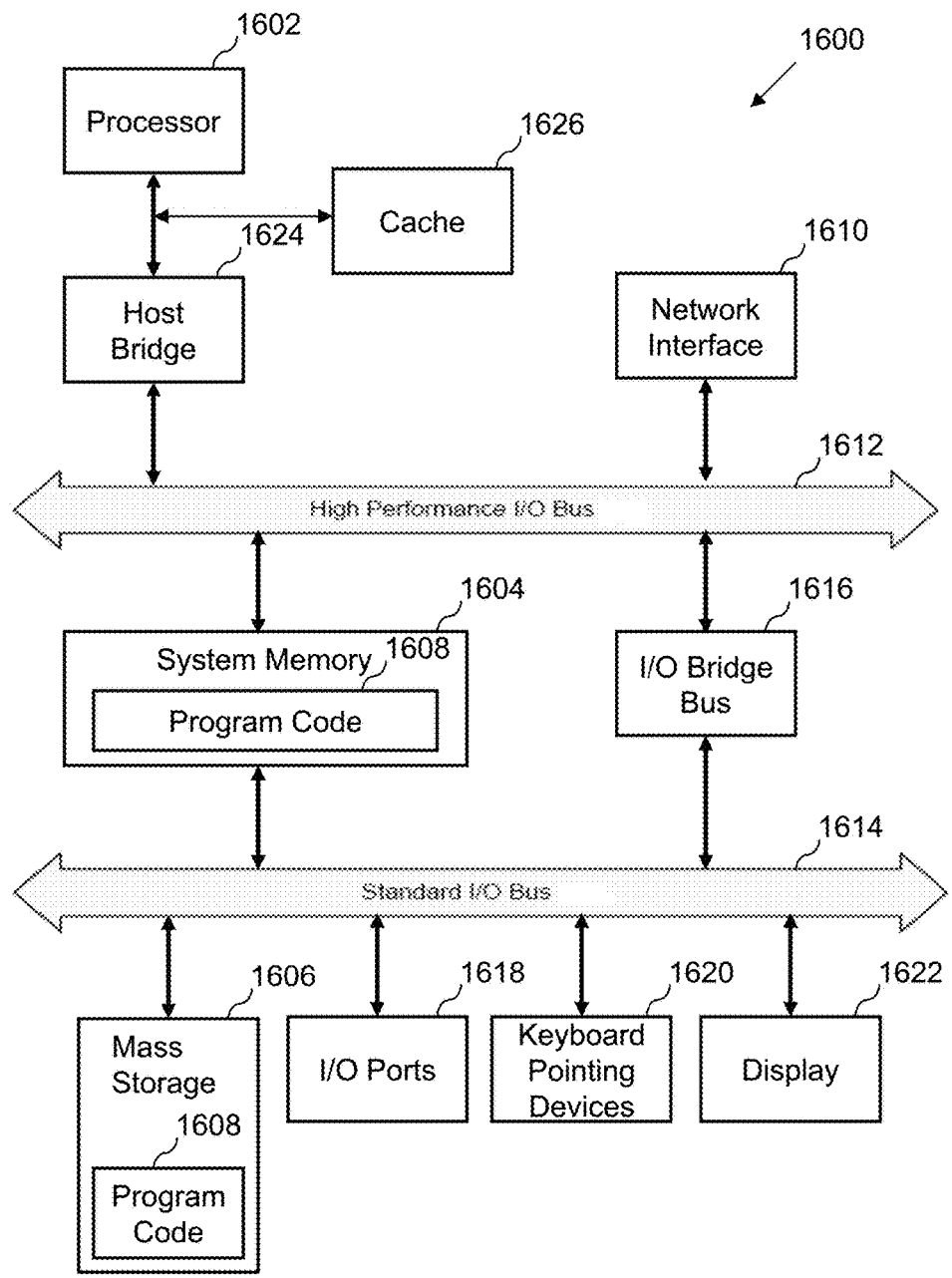
FIG. 16 is a schematic diagram illustrating an example computing system for providing one or more recommendations to the user according to one embodiment.

Although systems and methods have been described above with reference to specific embodiments, some or all of the elements or operations thereof may be implemented using a computer system having general purpose hardware architecture. FIG. 16 illustrates an example hardware system 1600 to implement ISEIS system 102 according to one embodiment. Hardware system 1600 includes at least one processor 1602, a system memory 1604, and a mass storage 1606. The system memory 1604 has stored therein one or more application software, programming instructions for implementing the methods disclosed herein, an operating system and drivers directed to the functions described herein. Mass storage 1606 provides permanent storage for the data and programming instructions for the methods disclosed herein, whereas system memory 1604 (e.g., DRAM) provides temporary storage for the data and programming instructions when executed by processor 1602. In an embodiment, the various database disclosed in conjunction with the present invention may reside in mass storage 1606. A network/communication interface 1610 provides communication between hardware system 1600 and any of a wide range of networks, such as an Ethernet (e.g., IEEE 802.3) network, etc. Additionally, hardware system 1600 includes a high performance input/output (I/O) bus 1612 and a standard I/O bus 1614. System memory 1604 and network/communication interface 1610 couple to bus 1612. Mass storage 1606 couple to bus 1614. An I/O Bus Bridge 1616 couples the two buses 1612 and 1614 to each other.

In one embodiment, various methods and processes described herein are implemented as a series of software routines run by hardware system 1600. These software routines comprise a plurality or series of instructions to be executed by a processor in a hardware system, such as processor 1602. Initially, the series of instructions are stored on a storage device, such as mass storage 1606. However, the series of instructions can be stored on any suitable storage medium, such as a diskette, CD-ROM, ROM, EEPROM, DVD, Blu-ray disk, etc. Furthermore, the series of instructions need not be stored locally, and could be received from a remote storage device, such as server on a network, via network/communication interface 1610. The instructions are copied from the storage device, such as mass storage 1606, into system memory 1604 and then accessed and executed by processor 1602.

In one embodiment, hardware system 1600 may also include I/O ports 1618, a keyboard and pointing device 1620, a display 1622 coupled to bus 1612. I/O ports 1618 are one or more serial and/or parallel communication ports that provide communication between additional peripheral devices, which may be coupled to hardware system 1600. A host bridge 1624 couples processor 1602 to high performance I/O bus 1612. Hardware system 1600 may further include video memory (not shown) and a display device coupled to the video memory. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

Hardware system 1600 may include a variety of system architectures; and various components of hardware system 1600 may be rearranged. For example, a cache 1626 may be on-chip with processor 1602. Alternatively, cache 1626 and processor 1602 may be packed together as a "processor module," with processor 1602 being referred to as the "processor core." Furthermore, certain embodiments of the present invention may not require nor include all of the above components. For example, the peripheral devices shown coupled to standard I/O bus 1614 may couple to high performance I/O bus 1612. In addition, in some embodiments only a single bus may exist with the components of hardware system 1600 being coupled to the single bus. Furthermore, hardware system 1600 may include additional components, such as additional processors, storage devices, or memories.

An operating system manages and controls the operation of hardware system 1600, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP/Server operating system, available from Microsoft Corporation of Redmond, Wash., the Apple Macintosh Operating System, available from Apple Computer Int. of Cupertino, Calif., UNIX operating systems, and the like.

While the present invention and its various functional components have been described in particular embodiments, it should be appreciated that the present invention can be implemented in hardware, software, firmware, middleware or a combination thereof and utilized in systems, subsystems, components or sub-components thereof. When implemented in software, the elements of the present invention are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g., a processor, a computer, etc.).

Further, although various figures in the specification illustrate the foregoing systems as separate systems, the functionality represented by each system may be combined into other systems. Furthermore, the functionality represented by each depicted system may be further separated. Still further, implementations of the present invention may operate in network environments that include multiples of one or more of the individual systems and sites disclosed herein. In addition, other implementations may operate in network environments where one or more of the systems described herein have been omitted.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

The invention claimed is:

1. A method comprising:
periodically receiving, at an application server over a network, real-time status information related to a plurality of users, said status information comprising at least information associated with at least one physical location of each user, said physical location associated with a physical location of a device of each user;
analyzing, via the application server, said received status information and extracting said physical location data for each user based on said analysis;
automatically, without user input, and based on the received real-time status information and extraction of the physical location data for each user, generating, via the application server, activity information for each user, said generated activity information comprising information associated with at least the respective physical locations of each user;
analyzing, via the application server, said generated activity information for each user in order to determine a set of users that are within a real-world, predetermined proximity to each other and to a physical location associated with an activity, said proximity associated with a geographic distance threshold, and to determine that said set of users have activity information indicating each user is at a physical location satisfying said proximity;
upon determining said set of users based on said analysis, identifying, via the application server, a profile for each user identified in said set of users, each identified profile comprising social information of a respective user, the social information comprising a list of other users with whom a user interacts, and a type and frequency of activities that the user performs with the other users identified in the social information;
analyzing, via the application server, the social information within each identified profile, and based on said analysis, determining social dynamics for each user, each user's social dynamic comprising a dynamically updated metric that represents, in real-time, that user's network influence on another user within said set of users;
creating, via the application server, an electronic message to communicate to a subset of said set of users based on said determined social dynamics, said electronic message comprising digital content associated with said activity; and
communicating, via the computing device, said electronic message to said subset of users, said communication causing a user interface (UI) to be displayed on a device of each user of the subset, wherein the digital content is displayed within each caused to be displayed UI.

2. The method of claim 1, further comprising:
querying a recommendations database to obtain a set of digital content based on parameters drawn, at least in part, from the profiles and status information of the users in the subset; and
ranking, via the application server applying software defined by a cluster model, the digital content in the set of digital content, wherein said communicated electronic message comprises said ranked set of digital content.

3. The method of claim 1, wherein the digital content in the electronic message comprises a search result associated with said activity.

4. The method of claim 1, wherein said status information further comprises at least one of a current location of the users and one or more past locations visited by the users.

5. The method of claim 1, wherein said status information further comprises temporal information of the users, the temporal information comprising at least one of time spent by a user with at least one other user, time spent by a user on one or more activities, frequency of one or more activities performed by a user, and timestamp information corresponding to one or more activities performed by a user.

6. The method of claim 1, further comprising:
receiving a request for recommendations for the activity from a user within said plurality of users; and
detecting that the activity is scheduled to occur within a pre-defined time.

7. The method of claim 1, wherein said set of users is determined based on computerized steps performed by the application server comprising:
determining and assigning a probability to each user in said set of users based on said status information of each user;
selecting the users with the highest probability, wherein said subset of users is further based on said highest probability selection; and
communicating, over the network, an interface to the selected users to edit the composition of the subset.

8. The method of claim 7, further comprising:
prompting each user in the subset for acceptance of being a member of the subset; and
updating the subset to exclude users that do not accept to be a member.

9. The method of claim 1, wherein the profile of each user comprises personal preferences and demographic information of each user.

10. An application server comprising:
a processor;
a non-transitory computer-readable storage medium for tangibly storing thereon program logic for execution by the processor, the program logic comprising:
logic executed by the processor for periodically receiving, at an application server over a network, real-time status information related to a plurality of users, said status information comprising at least information associated with at least one physical location of each user, said physical location associated with a physical location of a device of each user;
logic executed by the processor for analyzing, via the application server, said received status information and extracting said physical location data for each user based on said analysis;
logic executed by the processor for automatically, without user input, and based on the received real-time status information and extraction of the physical location data for each user, generating, via the application server, activity information for each user, said generated activity information comprising information associated with at least the respective physical locations of each user;
logic executed by the processor for analyzing, via the application server, said generated activity information for each user in order to determine a set of users that are within a real-world, predetermined proximity to each other and to a physical location associated with an activity, said proximity associated with a geographic distance threshold, and to determine that said set of users have activity information indicating each user is at a physical location satisfying said proximity;
logic executed by the processor for upon determining said set of users based on said analysis, identifying, via the application server, a profile for each user identified in said set of users, each identified profile comprising social information of a respective user, the social information comprising a list of other users with whom a user interacts, and a type and frequency of activities that the user performs with the other users identified in the social information;
logic executed by the processor for analyzing, via the application server, the social information within each identified profile, and based on said analysis, determining social dynamics for each user, each user's social dynamic comprising a dynamically updated metric that represents, in real-time, how effective that user's network influence on another user within said set of users;
logic executed by the processor for creating, via the application server, an electronic message to communicate to a subset of said set of users based on said determined social dynamics, said electronic message comprising digital content associated with said activity; and
logic executed by the processor for communicating, via the computing device, said electronic message to said subset of users, said communication causing a user interface (UI) to be displayed on a device of each user of the subset, wherein the digital content is displayed within each caused to be displayed UI.

11. The application server of claim 10, further comprising: logic executed by the processor for querying a recommendations database to obtain a set of digital content based on parameters drawn, at least in part, from the profiles and status information of the users in the subset; and logic executed by the processor for ranking, via the application server applying software defined by a cluster model, the digital content in the set of digital content, wherein said communicated electronic message comprises said ranked set of digital content.

12. The application server of claim 11, wherein the digital content in the electronic message comprises a search result associated with said activity.

13. The application server of claim 11, wherein said status information further comprises at least one of a current location of the users and one or more past locations visited by the users.

14. The application server of claim 11, wherein said status information further comprises temporal information of the users, the temporal information comprising at least one of time spent by a user with at least one other user, time spent by a user on one or more activities, frequency of one or more activities performed by a user, and timestamp information corresponding to one or more activities performed by a user.

15. The application server of claim 11, further comprising:
- logic executed by the processor for receiving a request for recommendations for the activity from a user within said plurality of users; and
- logic executed by the processor for detecting that the activity is scheduled to occur within a pre-defined time.

16. The application server of claim 11, wherein said set of users is determined based on computerized steps performed by the application server comprising:
- logic executed by the processor for determining and assigning a probability to each user in said set of users based on said status information of each user;
- logic executed by the processor for selecting the users with the highest probability, wherein said subset of users is further based on said highest probability selection; and
- logic executed by the processor for communicating, over the network, an interface to the selected users to edit the composition of the subset.

17. The application server of claim 16, further comprising:
- logic executed by the processor for prompting each user in the subset for acceptance of being a member of the subset; and
- logic executed by the processor for updating the subset to exclude users that do not accept to be a member.

18. A non-transitory computer-readable storage medium tangibly encoded with computer-executable instructions, which when executed by an application server, perform a method comprising:
- periodically receiving, at the application server over a network, real-time status information related to a plurality of users, said status information comprising at least information associated with at least one physical location of each user, said physical location associated with a physical location of a device of each user;
- analyzing, via the application server, said received status information and extracting said physical location data for each user based on said analysis;
- automatically, without user input, and based on the received real-time status information and extraction of the physical location data for each user, generating, via the application server, activity information for each user, said generated activity information comprising information associated with at least the respective physical locations of each user;
- analyzing, via the application server, said generated activity information for each user in order to determine a set of users that are within a real-world, predetermined proximity to each other and to a physical location associated with an activity, said proximity associated with a geographic distance threshold, and to determine that said set of users have activity information indicating each user is at a physical location satisfying said proximity;
- upon determining said set of users based on said analysis, identifying, via the application server, a profile for each user identified in said set of users, each identified profile comprising social information of a respective user, the social information comprising a list of other users with whom a user interacts, and a type and frequency of activities that the user performs with the other users identified in the social information;
- analyzing, via the application server, the social information within each identified profile, and based on said analysis, determining social dynamics for each user, each user's social dynamic comprising a dynamically updated metric that represents, in real-time, that user's network influence on another user within said set of users;
- creating, via the application server, an electronic message to communicate to a subset of said set of users based on said determined social dynamics, said electronic message comprising digital content associated with said activity; and
- communicating, via the computing device, said electronic message to said subset of users, said communication causing a user interface (UI) to be displayed on a device of each user of the subset, wherein the digital content is displayed within each caused to be displayed UI.

* * * * *